(12) United States Patent
Mizunaga

(10) Patent No.: US 12,472,582 B2
(45) Date of Patent: Nov. 18, 2025

(54) LASER PROCESSING APPARATUS AND DEBRIS REMOVER

(71) Applicant: DISCO CORPORATION, Tokyo (JP)

(72) Inventor: Yusuke Mizunaga, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 618 days.

(21) Appl. No.: 18/061,548

(22) Filed: Dec. 5, 2022

(65) Prior Publication Data

US 2023/0173611 A1 Jun. 8, 2023

(30) Foreign Application Priority Data

Dec. 7, 2021 (JP) ................................. 2021-198536

(51) Int. Cl.
*B23K 26/14* (2014.01)
*B23K 26/06* (2014.01)
*B23K 26/142* (2014.01)

(52) U.S. Cl.
CPC ........ *B23K 26/142* (2015.10); *B23K 26/0665* (2013.01); *B23K 26/1462* (2015.10)

(58) Field of Classification Search
CPC .............. B23K 26/142; B23K 26/0665; B23K 26/1462; B23K 2103/56; B23K 26/00; B23K 26/702; B23K 2101/36; B23K 26/16; B23K 26/064; B23K 26/14; B08B 5/02; B08B 15/04; H01L 21/67092
See application file for complete search history.

(56) References Cited

U.S. PATENT DOCUMENTS

| 4,319,120 A * | 3/1982 | la Rocca ............... B23K 26/12 219/121.84 |
| 6,290,266 B1 * | 9/2001 | Kawano ............... F16L 43/001 285/125.1 |
| 2020/0139489 A1 * | 5/2020 | Nakano ............... B23K 26/16 |
| 2021/0245299 A1 | 8/2021 | Masuda et al. |

FOREIGN PATENT DOCUMENTS

| DE | 3007205 A1 | 9/1980 |
| EP | 0940585 A1 | 9/1999 |
| JP | 2004337947 A | 12/2004 |
| JP | 2013184189 A * | 9/2013 |

OTHER PUBLICATIONS

Office Action issued in counterpart German patent application No. 10 2022 212 798.6, dated Mar. 26, 2025.

* cited by examiner

*Primary Examiner* — Tiffany T Tran
(74) *Attorney, Agent, or Firm* — Greer Burns & Crain Ltd.

(57) ABSTRACT

A debris remover includes an air nozzle that blows air from one side toward a processing point at which a workpiece is irradiated with a laser beam, a suction duct having a suction opening for sucking debris that has scattered to another side due to the air blown from the air nozzle, vortex generators formed on the processing point side of the suction opening for guiding the scattering debris into the suction duct, and a C-shaped sealing plate that is formed in such a manner as to surround the vortex generators from a rear side and reduces a space defined between the suction opening and the workpiece.

6 Claims, 5 Drawing Sheets

LASER PROCESSING APPARATUS AND DEBRIS REMOVER

BACKGROUND OF THE INVENTION

Field of the Invention

The present invention relates to a laser processing apparatus and a debris remover.

Description of the Related Art

A wafer having on a front surface thereof a device region in which a plurality of devices such as integrated circuits (ICs) and large scale integration (LSI) circuits are formed and a peripheral marginal region surrounding the device region is divided into individual device chips by a dicing apparatus or a laser processing apparatus, and the divided device chips are used for electric appliances such as mobile phones and personal computers.

The laser processing apparatus at least includes a chuck table for holding a wafer thereon, a laser irradiation unit that irradiates the wafer held on the chuck table with a laser beam emitted from a condenser thereof to process the wafer, and a feeding mechanism that processing-feeds the chuck table and the laser irradiation unit relative to each other, and the laser processing apparatus can thus process the wafer with high accuracy (refer to Japanese Patent Laid-open No. 2004-337947, for example).

SUMMARY OF THE INVENTION

The laser processing apparatus described above includes debris suction means that sucks and removes debris scattering at the time of laser processing, the debris suction means being disposed adjacent to the condenser. However, the debris suction means is not able to sufficiently suck the debris, and hence, the debris is not sufficiently prevented from scattering.

In addition, a similar problem arises also in the case of using a processing apparatus that irradiates the wafer at a boundary between the device region and the peripheral marginal region with a laser beam to remove the peripheral marginal region from the wafer.

Accordingly, it is an object of the present invention to provide a laser processing apparatus and a debris remover that can sufficiently suck debris scattering at the time of laser processing.

In accordance with an aspect of the present invention, there is provided a laser processing apparatus including a chuck table having a holding surface to hold a workpiece thereon and a laser irradiation unit that irradiates the workpiece held on the chuck table with a laser beam to process the workpiece. The laser irradiation unit includes a laser oscillator that emits a laser beam, a condenser that focuses the laser beam emitted by the laser oscillator and irradiates the workpiece held on the chuck table with the focused laser beam, and a debris remover that is disposed adjacent to the condenser and sucks and removes debris generated through the irradiation with the laser beam. The debris remover includes an air nozzle that blows air from one side toward a processing point at which the workpiece is irradiated with the laser beam, a suction duct having a suction opening for sucking debris that has scattered to another side due to the air blown from the air nozzle, vortex generators formed on a processing point side of the suction opening for guiding the scattering debris into the suction duct, and a C-shaped sealing plate that is formed in such a manner as to surround the vortex generators from a rear side and reduces a space defined between the suction opening and the workpiece.

Preferably, a slit is formed in the sealing plate on a side facing the workpiece, the side being opposite to the vortex generators across the suction opening.

Preferably, the holding surface of the chuck table faces downward, the condenser is disposed on a lower side with respect to the holding surface, and the workpiece held on the chuck table is irradiated from below with the laser beam.

Preferably, the workpiece is a wafer having a device region in which a plurality of devices are formed in respective areas demarcated by a plurality of crossing planned division lines and a peripheral marginal region surrounding the device region, and a boundary between the device region and the peripheral marginal region is irradiated with the laser beam.

In accordance with another aspect of the present invention, there is provided a debris remover disposed adjacent to a condenser of a laser processing apparatus, the laser processing apparatus including a laser oscillator that emits a laser beam and the condenser that focuses the laser beam emitted by the laser oscillator and irradiates a workpiece held on a chuck table with the focused laser beam. The debris remover includes an air nozzle that blows air from one side toward a processing point at which the workpiece is irradiated with the laser beam, a suction duct having a suction opening for sucking debris that has scattered to another side due to the air blown from the air nozzle, vortex generators formed on a processing point side of the suction opening for guiding the scattering debris into the suction duct, and a C-shaped sealing plate that is formed in such a manner as to surround the vortex generators from a rear side and reduces a space defined between the suction opening and the workpiece.

Preferably, a slit is formed in the sealing plate on a side facing the workpiece, the side being opposite to the vortex generators across the suction opening.

According to the present invention, debris scattering at the time of the laser processing can effectively be guided into the suction duct, so that the debris can sufficiently be sucked.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

A laser processing apparatus and a debris remover according to an embodiment of the present invention will be described hereinbelow in detail with reference to the accompanying drawings.

Figure 1:
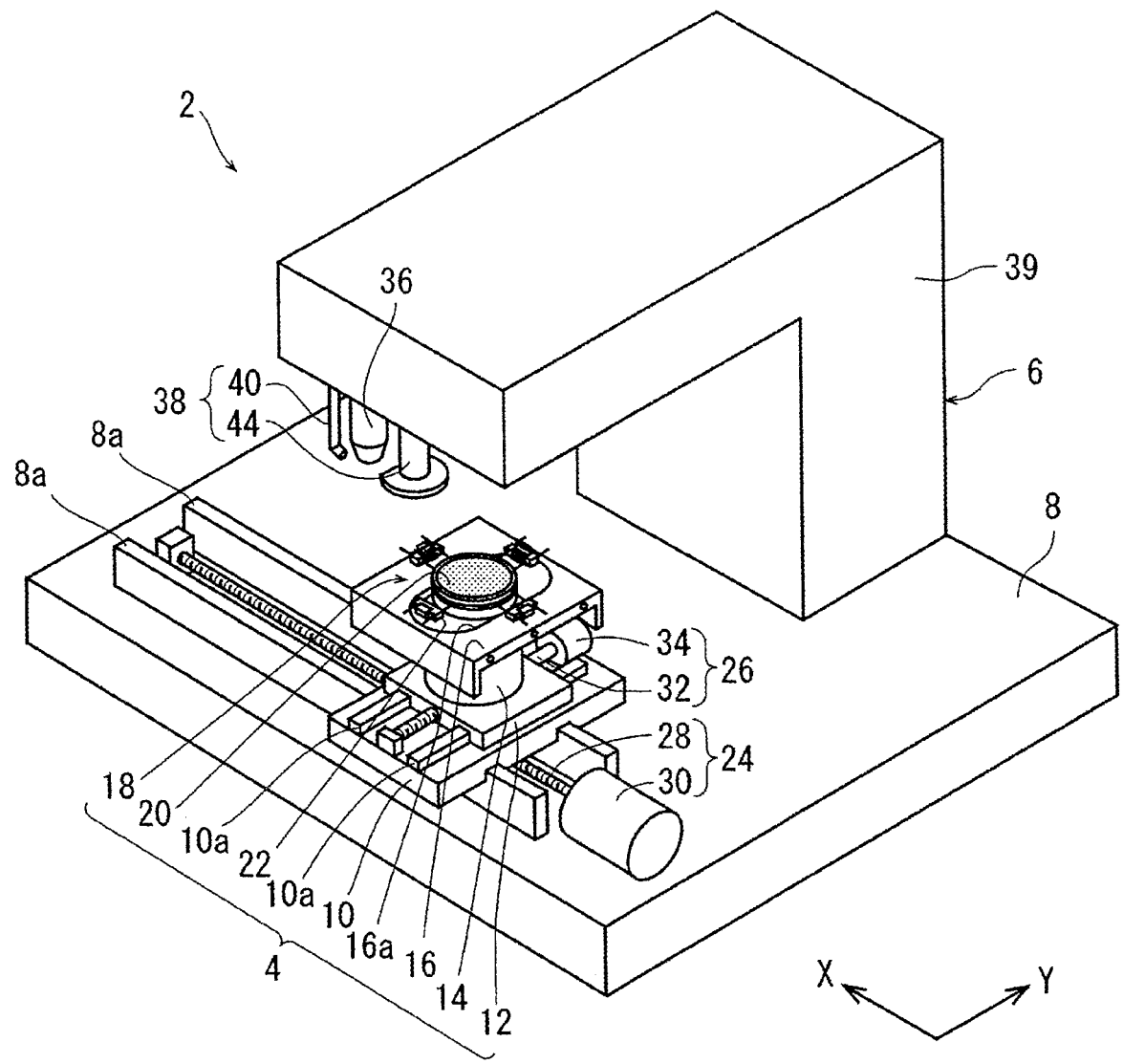
FIG. 1 is a perspective view of a laser processing apparatus according to an embodiment of the present invention.

As illustrated in FIG. 1, the laser processing apparatus, generally denoted by 2, includes a holding unit 4 having a holding surface to hold a workpiece thereon and a laser irradiation unit 6 that irradiates the workpiece held by the holding unit 4 with a laser beam to process the workpiece.

The holding unit 4 includes an X-axis movable plate 10 mounted on an upper surface of a base 8 in such a manner as to be movable in an X-axis direction, a Y-axis movable plate 12 mounted on an upper surface of the X-axis movable plate 10 in such a manner as to be movable in a Y-axis direction, a support column 14 fixed to an upper surface of the Y-axis movable plate 12, and a cover plate 16 fixed to an upper end of the support column 14. The cover plate 16 has an elongate hole 16a formed therein in the manner extending in the Y-axis direction, and a chuck table 18 extending upward through the elongate hole 16a is rotatably mounted to the upper end of the support column 14.

It is to be noted that the X-axis direction is a direction indicated by an arrow X in FIG. 1 and that the Y-axis direction is a direction indicated by an arrow Y in FIG. 1, the Y-axis direction orthogonally intersecting the X-axis direction. An XY plane defined by the X-axis direction and the Y-axis direction is substantially horizontal.

The chuck table 18 has at an upper end portion thereof a porous, circular suction chuck 20 connected to suction means (not illustrated). In a periphery of the chuck table 18, a plurality of clamps 22 are disposed at intervals in a circumferential direction.

The suction means generates a suction force to act on an upper surface of the suction chuck 20 of the holding unit 4, thereby holding under suction the workpiece placed on the upper surface of the suction chuck 20. In this manner, the upper surface of the suction chuck 20 serves as the holding surface for holding the workpiece thereon, and the holding surface faces upward.

Further, the chuck table 18 of the holding unit 4 is processing-fed in the X-axis direction by an X-axis feeding mechanism 24 and is index-fed in the Y-axis direction by a Y-axis feeding mechanism 26.

The X-axis feeding mechanism 24 includes a ball screw 28 that is connected to the X-axis movable plate 10 and extends in the X-axis direction, and a motor 30 that rotates the ball screw 28 about its central axis. The X-axis feeding mechanism 24 converts rotational motion of the motor 30 into linear motion with use of the ball screw 28 and transmits the linear motion to the X-axis movable plate 10 to move the X-axis movable plate 10 in the X-axis direction along guide rails 8a on the base 8. The chuck table 18 is thus processing-fed in the X-axis direction.

The Y-axis feeding mechanism 26 includes a ball screw 32 that is connected to the Y-axis movable plate 12 and extends in the Y-axis direction, and a motor 34 that rotates the ball screw 32 about its central axis. The Y-axis feeding mechanism 26 converts rotational motion of the motor 34 into linear motion with use of the ball screw 32 and transmits the linear motion to the Y-axis movable plate 12 to move the Y-axis movable plate 12 in the Y-axis direction along guide rails 10a on the X-axis movable plate 10. The chuck table 18 is thus index-fed in the Y-axis direction.

In addition, the chuck table 18 can be rotated about its central axis extending along an upward-downward direction, by a chuck table motor (not illustrated) built in the support column 14.

The laser irradiation unit 6 includes a laser oscillator (not illustrated) that emits a laser beam, a condenser 36 that focuses the laser beam emitted by the laser oscillator and irradiates the workpiece held by the holding unit 4 with the focused laser beam, and a debris remover 38 that is disposed adjacent to the condenser 36 and sucks and removes debris generated through the irradiation with the laser beam.

As illustrated in FIG. 1, the laser irradiation unit 6 includes a housing 39 that extends upward from the upper surface of the base 8 and then extends in a substantially horizontal direction. The above-described laser oscillator of the laser irradiation unit 6 is disposed inside the housing 39, and the condenser 36 is mounted to a lower surface of a distal end of the housing 39.

Figure 2:
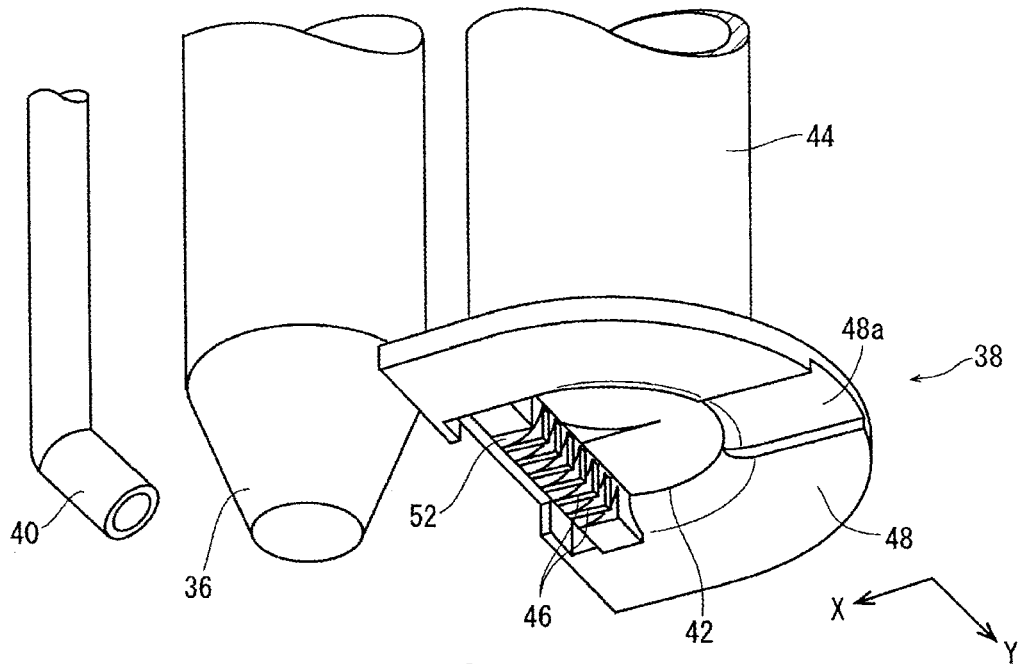
FIG. 2 is a perspective view of a debris remover illustrated in FIG. 1, as viewed from below.

With reference to FIG. 2 as well as FIG. 1, the debris remover 38 includes an air nozzle 40 that blows air from one side toward a processing point at which the workpiece is irradiated with the laser beam, a suction duct 44 having a suction opening 42 (refer to FIG. 2) for sucking debris that has scattered to another side due to the air blown from the air nozzle 40, vortex generators 46 (refer to FIG. 2) formed on the processing point side of the suction opening 42 for guiding the scattering debris into the suction duct 44, and a C-shaped sealing plate 48 (refer to FIG. 2) that is formed in such a manner as to surround the vortex generators 46 from a rear side and reduces a space defined between the suction opening 42 and the workpiece.

As illustrated in FIG. 1, the air nozzle 40 is mounted at a position on the lower surface of the distal end of the housing 39, the position being adjacent the condenser 36. The air nozzle 40 is connected to an air supply source (not illustrated) and blows air, which is supplied from the air supply source, from the one side toward the processing point at which the workpiece is irradiated with the laser beam.

As illustrated in FIG. 1, the suction duct 44 is mounted at a position on the lower surface of the distal end of the housing 39, the position being on a side opposite to the air nozzle 40 across the condenser 36. Further, the suction duct 44 is connected to suction means (not illustrated). The suction means generates a suction force to act in a direction into the suction opening 42 of the suction duct 44, so that the debris that has scattered to the other side due to the air blown from the air nozzle 40 is sucked into the suction opening 42.

Figure 3:
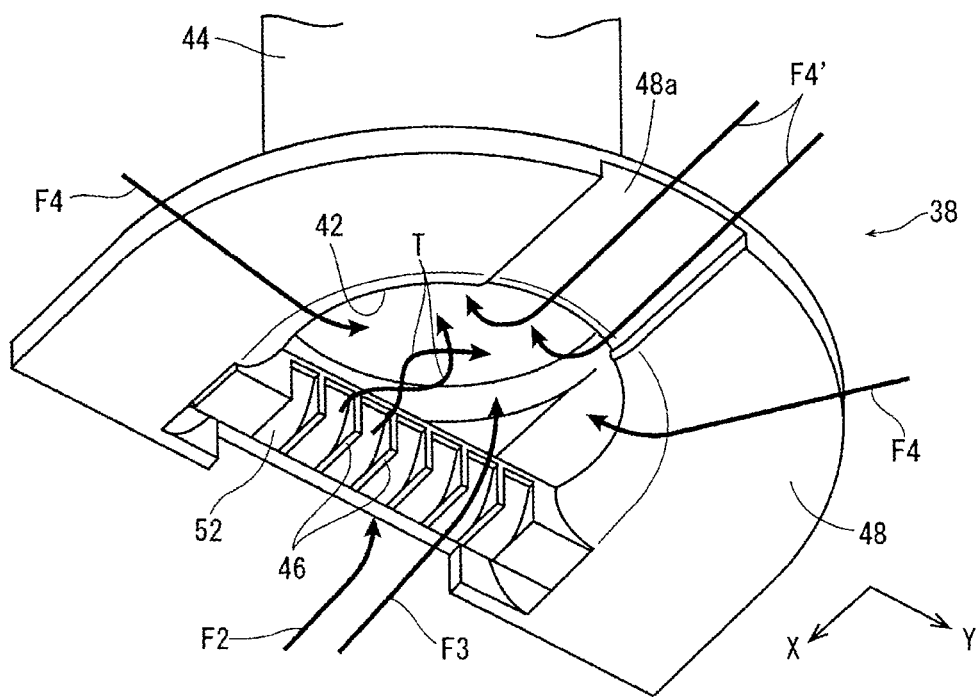
FIG. 3 is a perspective view of a suction duct illustrated in FIG. 1, as viewed from below.
Figure 4:
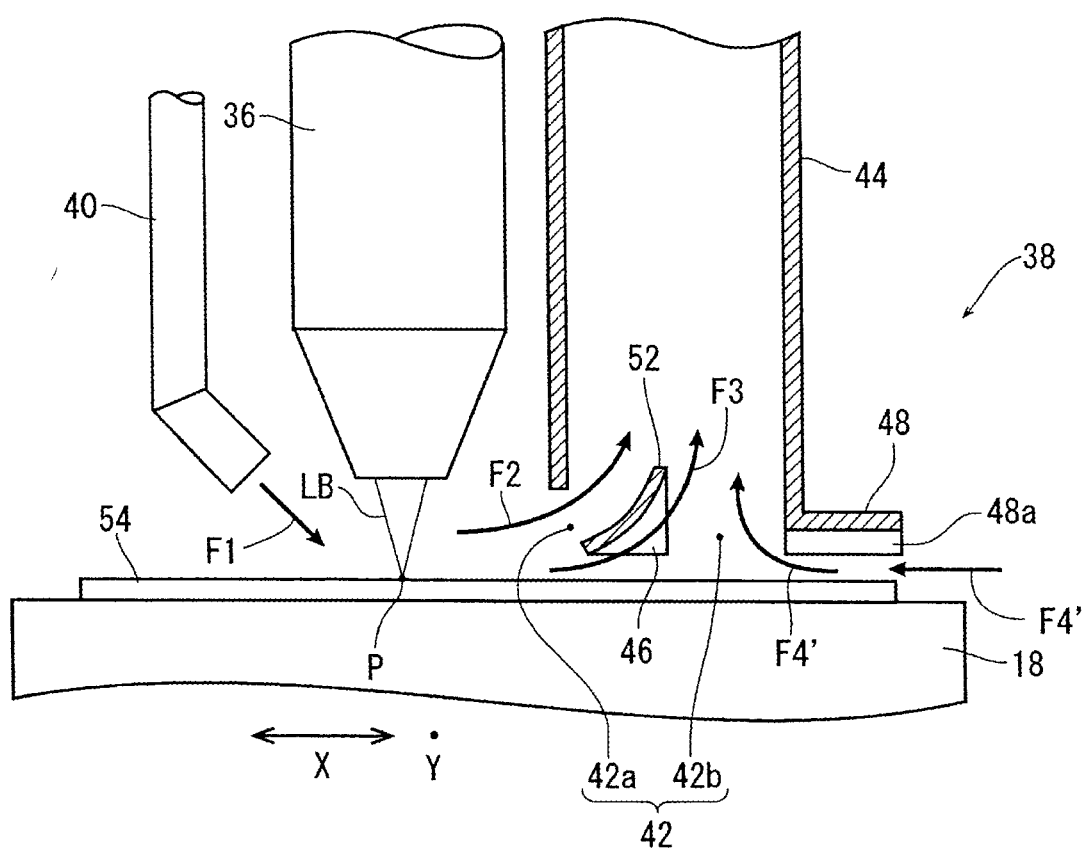
FIG. 4 is a side elevational view, partially in cross section, illustrating a state in which the laser processing apparatus illustrated in FIG. 1 is carrying out laser processing on a workpiece.

As illustrated in FIG. 2 and FIG. 3, a platelike member 52 is stretched on the processing point side of the suction opening 42 in such a manner as to extend in the Y-axis direction. As understood by referring FIG. 4, the platelike member 52 has an arcuate cross-sectional shape (a section crossing the Y-axis direction). The platelike member 52 is provided with the plurality of vortex generators 46 that are each in the shape of a triangle and are disposed at intervals in the Y-axis direction. Further, as illustrated in FIG. 4, the suction opening 42 is partitioned by the platelike member 52 into an upstream-side portion 42a and a downstream-side portion 42b.

The sealing plate 48 is formed in a C shape along a periphery of the suction opening 42. Further, the sealing plate 48 is disposed in parallel with the holding surface of the holding unit 4 (the upper surface of the suction chuck 20). At the time the workpiece is irradiated with the laser beam, the sealing plate 48 is positioned slightly above (substantially 2 mm above, for example) an upper surface of the workpiece.

In the present embodiment, a slit 48a is formed in the sealing plate 48 on a side facing the workpiece, the side being opposite to the vortex generators 46 across the suction opening 42. As illustrated in FIG. 2 and FIG. 3, the slit 48a is a recess formed in a lower surface of the sealing plate 48 and extends from an inner peripheral edge to an outer peripheral edge of the sealing plate 48.

Figure 5A:
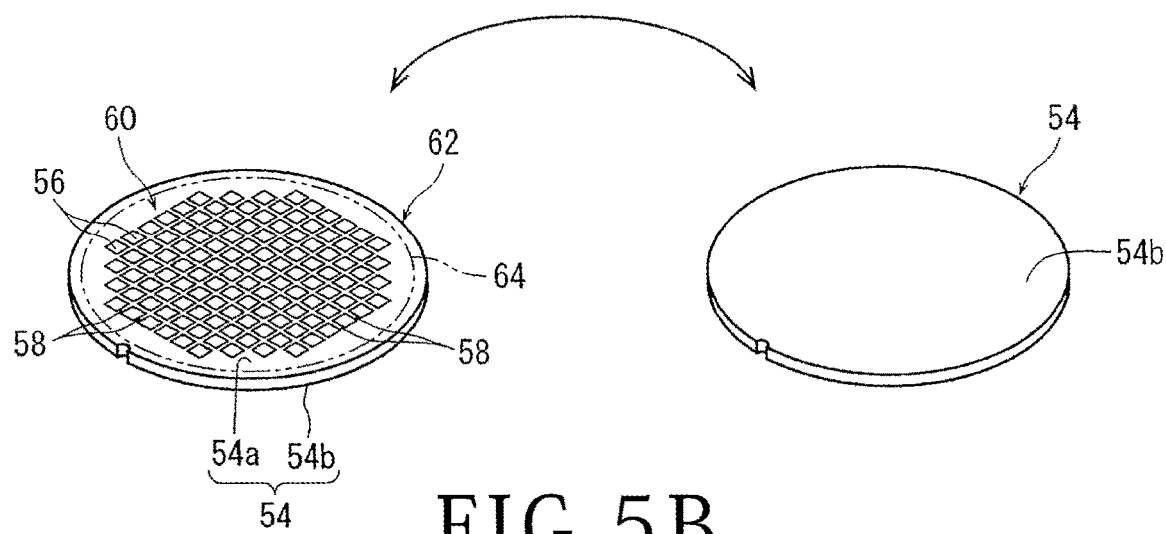
FIG. 5A is a perspective view of a wafer with no reinforcing part.
Figure 5B:
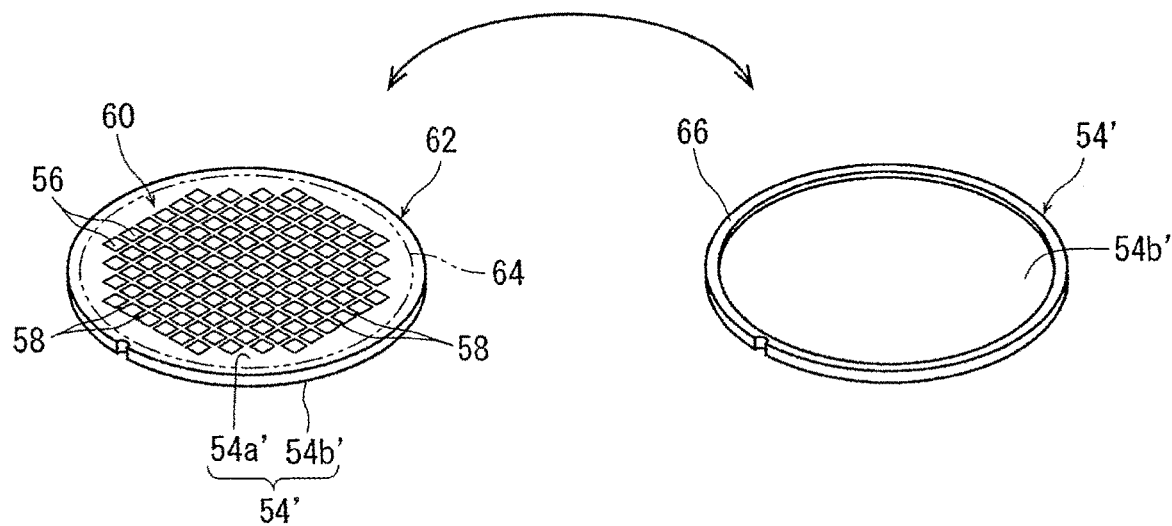
FIG. 5B is a perspective view of a wafer with a reinforcing part.

FIG. 5A and FIG. 5B illustrate workpieces that can be processed by the laser processing apparatus 2 described above. A workpiece 54 illustrated in FIG. 5A is a wafer having a device region 60, in which a plurality of devices 56 are formed in respective areas demarcated by planned division lines 58, and a peripheral marginal region 62 surrounding the device region 60. In FIG. 5A and FIG. 5B, a boundary 64 between the device region 60 and the peripheral marginal region 62 is indicated by a two-dot-and-dash line for the sake of convenience, but there exists no line indicating the boundary 64 in practice.

It is to be noted that, as illustrated in FIG. 5B, the workpiece may be a wafer 54' having a ring-shaped reinforcing part 66 formed in such a manner as to protrude from a back surface 54b' at a position corresponding to the peripheral marginal region 62.

Next, a method for carrying out laser processing on the workpiece 54 with use of the laser processing apparatus 2 will be described.

In the present embodiment, first, the workpiece 54 is placed on the holding surface of the holding unit 4 (the upper surface of the suction chuck 20) in such a manner that a front surface 54a (the surface on which the devices 56 are formed) of the workpiece 54 faces upward. The suction means connected to the suction chuck 20 is then actuated to hold the workpiece 54 under suction on the upper surface of the suction chuck 20. It is to be noted that, preferably, the surface of the workpiece 54 to be processed is coated in advance with a protective film made of polyvinyl alcohol or the like in order to prevent debris from adhering to the surface of the workpiece 54 to be processed.

Next, the workpiece 54 is imaged from above by an imaging unit (not illustrated) of the laser processing apparatus 2, and a positional relation between the workpiece 54 and the condenser 36 is adjusted on the basis of the image captured of the workpiece 54 by the imaging unit. In this regard, a laser beam LB is focused on processing target positions to be laser-processed (the planned division lines 58, for example) and a focusing point of the laser beam LB is adjusted in height to be positioned on the upper surface of the workpiece 54.

The laser beam LB having an absorption wavelength to the workpiece 54 is then applied from the condenser 36 while the chuck table 18 is being moved in such a manner that the focusing point of the laser beam LB sequentially passes through the processing target positions. In this manner, predetermined ablation processing can be carried out along the processing target positions (the planned division lines 58, for example).

Needless to say, it is also possible to carry out the ablation processing for positions other than the planned division lines 58. For example, in a case in which the ring-shaped reinforcing part 66 is to be removed from the wafer 54', the ablation processing may be carried out by irradiating the boundary 64 between the device region 60 and the peripheral marginal region 62 with the laser beam LB, to thereby form a ring-shaped cut groove along the boundary 64.

In carrying out the ablation processing, the air supply source and the suction means of the debris remover 38 are actuated, so that the air nozzle 40 blows air from one side (the left side in FIG. 4) toward a processing point P, as indicated by an arrow F1 in FIG. 4, and the suction means generates a suction force to act in the direction into the suction opening 42. This causes debris generated during the ablation processing to scatter to another side (the right side in FIG. 4) due to the air blown from the air nozzle 40, and the scattering debris is sucked into the suction opening 42.

In the present embodiment, the platelike member 52 is stretched on the processing point P side of the suction opening 42, and the air containing debris is sucked through both the upstream-side portion 42a and the downstream-side portion 42b of the suction opening 42.

As described above, since the platelike member 52 has an arcuate cross-sectional shape, the air sucked through the upstream-side portion 42a of the suction opening 42 is guided by an upper surface of the platelike member 52 to be delivered into the suction duct 44 as indicated by an arrow F2 in FIG. 4.

As for the air sucked through the downstream-side portion 42b, since the vortex generators 46 are provided on a lower surface of the platelike member 52, turbulence T (refer to FIG. 3) including a small vortex occurs on a downstream side of the vortex generators 46. This suppresses separation of the air flow from the lower surface of the platelike member 52, and the air containing debris easily flows along the lower surface of the platelike member 52 as indicated by an arrow F3 in FIG. 3 and FIG. 4. Accordingly, since the vortex generators 46 are provided in the present embodiment, the debris scattering from the processing point P can effectively be guided into the suction duct 44.

When a small vortex occurs on the downstream side of the vortex generators 46, energy of the air blown from the air nozzle 40 is consumed. In addition, as for the air flow indicated by the arrow F3 in FIG. 4, the flow passage on the downstream side of the platelike member 52 is wider than that on the upstream side of the platelike member 52. As a result, a flow speed of the air blown from the air nozzle 40 is significantly reduced on the downstream side of the vortex generators 46, so that the scattering debris can easily be guided into the suction duct 44.

When the laser processing is being carried out, air around the suction opening 42, other than the air blown from the air nozzle 40, flows into the downstream-side portion 42b of the suction opening 42 through a space defined between the upper surface of the workpiece 54 and the lower surface of the sealing plate 48 (refer to arrows F4 in FIG. 3).

Since the sealing plate 48 is positioned close to the upper surface of the workpiece 54 at the time of the laser processing as described above, a space between the suction opening 42 and the workpiece 54 is reduced by the sealing plate 48. This increases a flow speed of the flow F4 between the sealing plate 48 and the workpiece 54, so that the air blown from the air nozzle 40 (the air containing debris) can be prevented from escaping from the suction opening 42.

Moreover, in the present embodiment, the slit 48a is formed in the sealing plate 48 on the side facing the workpiece 54, the side being opposite to the vortex generators 46 across the suction opening 42. Therefore, in the flow F4, a flow rate of a flow F4' passing through the slit 48a is relatively high. As understood by referring FIG. 4, the flow F4' at the slit 48a is opposite to the flow of the air blown from the air nozzle 40. That is, with the slit 48a provided in the sealing plate 48, the flow rate of the flow F4' opposite to the flow of the air blown from the air nozzle 40 is increased.

Therefore, it is further effectively prevented that the air blown from the air nozzle 40 (the air containing debris) escapes from the suction opening 42.

As described above, in the present embodiment, the debris scattering from the processing point P due to the irradiation with the laser beam LB can effectively be guided into the suction duct 44, so that the debris can sufficiently be sucked.

Figure 6:
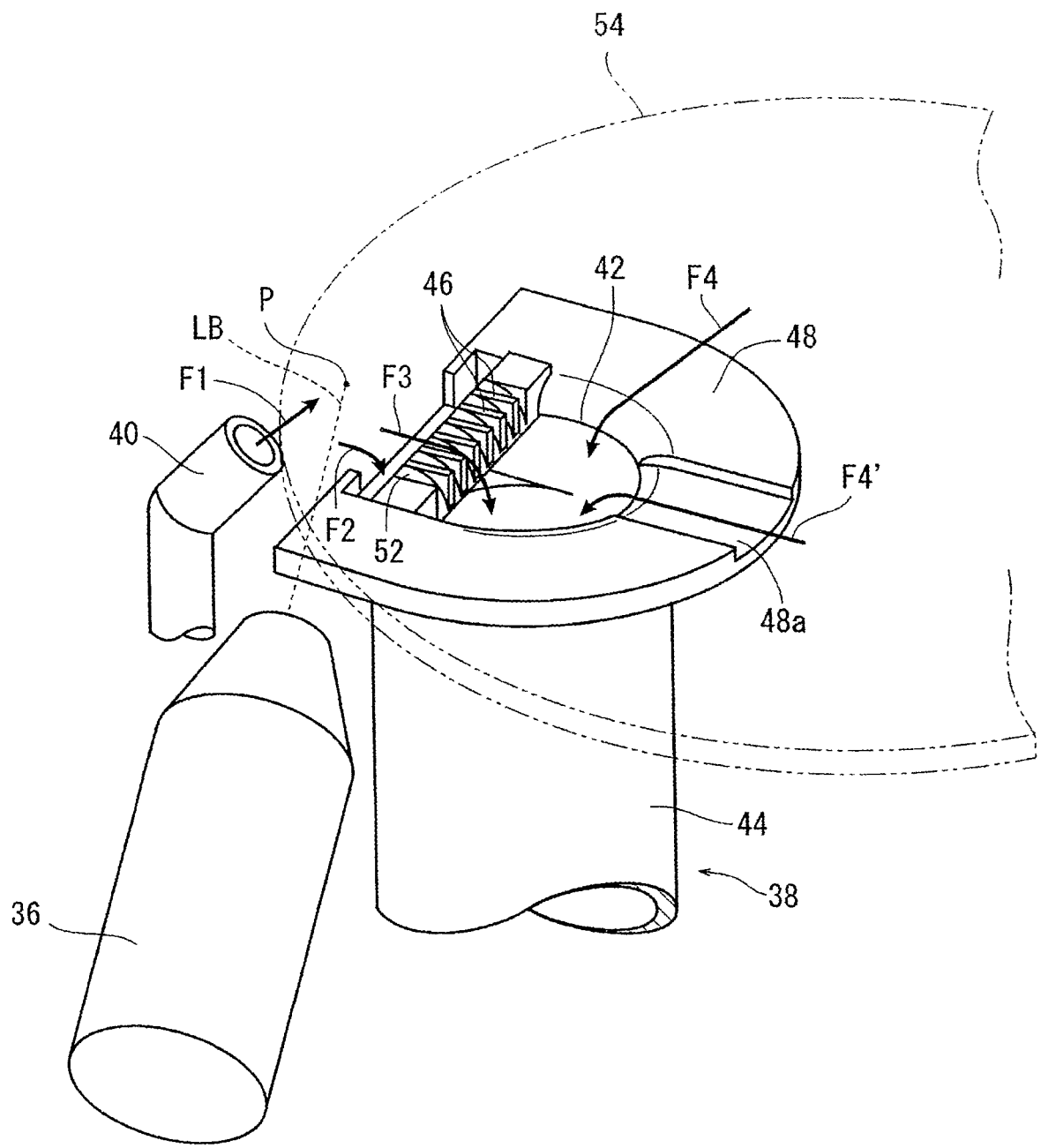
FIG. 6 is a perspective view of a debris remover according to a modification example.

It is to be noted that, while, in the present embodiment, the case in which the workpiece held by the holding unit 4 is irradiated from above with the laser beam LB is described as an example, it is also possible to irradiate the workpiece held by the holding unit 4 from below with the laser beam LB as illustrated in FIG. 6.

In this case, though the holding unit 4 is not illustrated in FIG. 6, the holding surface of the holding unit 4 faces downward, and the holding unit 4 holds the upper surface side of the workpiece under suction with the lower surface side of the workpiece exposed. Further, the condenser 36 is disposed at a position on the lower side with respect to the holding surface, the position being separated from a position directly below the processing point P. Accordingly, even if debris generated from the processing point P drops without being sucked, the debris is prevented from adhering to the condenser 36.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus comprising:
   a chuck table having a holding surface to hold a workpiece thereon; and
   a laser irradiation unit that irradiates the workpiece held on the chuck table with a laser beam to process the workpiece,
   wherein the laser irradiation unit includes
      a laser oscillator that emits a laser beam,
      a condenser that focuses the laser beam emitted by the laser oscillator and irradiates the workpiece held on the chuck table with the focused laser beam, and
      a debris remover that is disposed adjacent to the condenser and sucks and removes debris generated through the irradiation with the laser beam, and
   the debris remover includes
      an air nozzle that blows air from one side toward a processing point at which the workpiece is irradiated with the laser beam,
      a suction duct having a suction opening for sucking debris that has scattered to another side due to the air blown from the air nozzle,
      vortex generators formed on a processing point side of the suction opening for guiding the scattering debris into the suction duct, and
      a C-shaped sealing plate that is formed in such a manner as to surround the vortex generators from a rear side and reduces a space defined between the suction opening and the workpiece.

2. The laser processing apparatus according to claim 1, wherein a slit is formed in the sealing plate on a side facing the workpiece, the side being opposite to the vortex generators across the suction opening.

3. The laser processing apparatus according to claim 1, wherein the holding surface of the chuck table faces downward, the condenser is disposed on a lower side with respect to the holding surface, and the workpiece held on the chuck table is irradiated from below with the laser beam.

4. The laser processing apparatus according to claim 3, wherein the workpiece is a wafer having a device region in which a plurality of devices are formed in respective areas demarcated by a plurality of crossing planned division lines and a peripheral marginal region surrounding the device region, and a boundary between the device region and the peripheral marginal region is irradiated with the laser beam.

5. A debris remover disposed adjacent to a condenser of a laser processing apparatus, the laser processing apparatus including a laser oscillator that emits a laser beam and the condenser that focuses the laser beam emitted by the laser oscillator and irradiates a workpiece held on a chuck table with the focused laser beam, the debris remover comprising:
   an air nozzle that blows air from one side toward a processing point at which the workpiece is irradiated with the laser beam;
   a suction duct having a suction opening for sucking debris that has scattered to another side due to the air blown from the air nozzle;
   vortex generators formed on a processing point side of the suction opening for guiding the scattering debris into the suction duct; and
   a C-shaped sealing plate that is formed in such a manner as to surround the vortex generators from a rear side and reduces a space defined between the suction opening and the workpiece.

6. The debris remover according to claim 5, wherein a slit is formed in the sealing plate on a side facing the workpiece, the side being opposite to the vortex generators across the suction opening.

* * * * *